United States Patent
Mokshagundam et al.

(10) Patent No.: US 11,258,846 B1
(45) Date of Patent: Feb. 22, 2022

(54) REAL-TIME SERVERLESS STREAMING IN A MULTI-CLOUD ENVIRONMENT

(71) Applicant: Capital One Services, LLC, McLean, VA (US)

(72) Inventors: Rajendra Prasad Mokshagundam, Naperville, IL (US); Sunil Kaduskar, Schaumburg, IL (US); Ravikanth Kompella, Rolling Meadows, IL (US); Sunil Pradhan Sharma, Schaumburg, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/330,603

(22) Filed: May 26, 2021

(51) Int. Cl.
*H04L 29/08* (2006.01)
*G06F 16/27* (2019.01)
*G06F 16/182* (2019.01)
*H04L 67/06* (2022.01)
*H04L 67/10* (2022.01)

(52) U.S. Cl.
CPC ............ *H04L 67/06* (2013.01); *G06F 16/182* (2019.01); *G06F 16/27* (2019.01); *H04L 67/10* (2013.01)

(58) Field of Classification Search
CPC ......... H04L 67/06; H04L 67/10; G06F 16/27; G06F 16/182
See application file for complete search history.

(56) References Cited

U.S. PATENT DOCUMENTS

| 2012/0233293 A1* | 9/2012 | Barton ................ G06F 11/1004 709/219 |
| 2014/0279893 A1* | 9/2014 | Branton ................ G06F 16/904 707/634 |
| 2020/0195558 A1 | 6/2020 | Schultz et al. |
| 2021/0191945 A1* | 6/2021 | Li ........................... G06F 16/27 |

FOREIGN PATENT DOCUMENTS

WO    2008007805 A2    1/2008

* cited by examiner

*Primary Examiner* — Wing F Chan
*Assistant Examiner* — Billy H Ng
(74) *Attorney, Agent, or Firm* — Banner & Witcoff, Ltd.

(57) ABSTRACT

A system, process, and computer-readable medium for processing received files across different cloud-based platforms is disclosed. A process may include selecting a first cloud-based processing system of multiple cloud-based processing systems, serializing the file, and sending the file to the selected cloud-based processing system. If the selected cloud-based processing system does not complete processing of the first file within a time threshold, the process may select a second cloud-based processing system and send the first file to that selected second cloud-based processing system. The method may further comprise a library of cloud-specific software migration operations. General functions to be run on cloud-based processing systems may be translated into platform-specific functions to be run in a specific cloud-based processing system.

20 Claims, 11 Drawing Sheets

| File ID | Time File Received TR | Selected Cloud | Time Sent to Cloud TC | Finished? | Too long? TC-Current Time ≥ Threshold | Time Finished TF | Reprocess in Other Cloud? | Backpressure? |
|---|---|---|---|---|---|---|---|---|
| File_01 | P | Cloud A | U | Yes | No | E | No | No |
| File_02 | Q | Cloud C | V | Yes | No | F | No | No |
| File_03 | R | Cloud A | W | No | Yes | | Yes | Yes |
| File_04 | S | Cloud B | X | No | Yes | | Yes | Yes |
| File_05 | T | Cloud D | Y | Yes | Yes | G | No | Yes |
| File_03 | X1 | Cloud C | X2 | No | No | | | |
| File_04 | Y1 | Cloud C | Y2 | No | No | | | |

FIG. 9

REAL-TIME SERVERLESS STREAMING IN A MULTI-CLOUD ENVIRONMENT

FIELD OF USE

Aspects of the disclosure relate generally to processing of information using cloud-based services.

BACKGROUND

Cloud-based services provide improvements over user-managed devices. To lessen development costs, companies often select one cloud-based service provider to handle computing tasks. Using that single cloud-based service provider, companies enjoy the benefits of that service provider's scalability to handle peak loads as needed. If each company was to purchase hardware to handle those peak loads, each company may be paying for hardware that sits idle most of the time. Despite the overall robustness of the Internet, cloud-based services are subject to issues common to other computing platforms including communication-related issues and processing-related issues.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other problems, and generally improve how companies use cloud-based services. In additional aspects, based on the improvements in how companies use cloud-based services, the companies' customers may also experience benefits in reduced computing delays. Possible use-cases may include spike-prone computing tasks as well as computing tasks where users expect immediate results. In some situations, companies may be aware of delays encountered by their cloud-based service providers (e.g., being proactively updated by the cloud-based service providers) while, in other situations, the companies may not be aware of delays until after backlogs exist (e.g., where communication failures with the cloud-based service providers are the issue). One or more aspects are directed to improving the handling of cloud-based processing requests by identifying where files have not been timely processed by a cloud-based service provider, selecting a new cloud-based service provider, and routing the files to the newly selected cloud-based service provider. Other aspects may comprise creating general functions to be implemented in a cloud-based service, identifying cloud-based service providers, creating software specific for each cloud-based service provider, and deploying the specific software for the functions to be implemented in the selected cloud-based service providers. By identifying delays and routing delayed files to a new cloud-based service provider, significant processing delays may be avoided and, thus, reduce delays encountered by the companies' customers.

According to some aspects, these and other benefits may be achieved by using a computer-implemented method that may comprise receiving, at a gateway, a transaction data stream and parsing the transaction data stream into separate files. Each file may comprise multiple transactions. For a first file, the method may comprise selecting a first cloud-based processing system of multiple cloud-based processing systems. Each of the cloud-based processing systems may be configured to implement one or more functions on the received files. The first file may be serialized and sent to the selected cloud-based processing system. If the selected cloud-based processing system does not complete processing of the first file within a threshold, the method may select a second cloud-based processing system and send the first file to that selected second cloud-based processing system. The method may further comprise a library of cloud-specific software migration operations. General functions to be run on cloud-based processing systems may be translated into platform-specific functions to be run in a specific cloud-based processing system.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 9 is an example of a dataset that may be used to track and coordinate processing of files by different cloud-computing platforms;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for monitoring cloud-based platforms for the processing of files. The files may be time-sensitive. In the event that a first cloud-based platform is delayed in its processing of a file, the system may redirect that file to another cloud-based platform for processing. The determination of the delay may be based on a threshold time. Additionally or alternatively, the system may support generation and/or deployment of common functions to the cloud-based platforms. Before discussing these concepts in greater detail, however, several examples of a computing device that may be used in implementing and/or otherwise providing various aspects of the disclosure will first be discussed with respect to FIG. 1.

Figure 1:
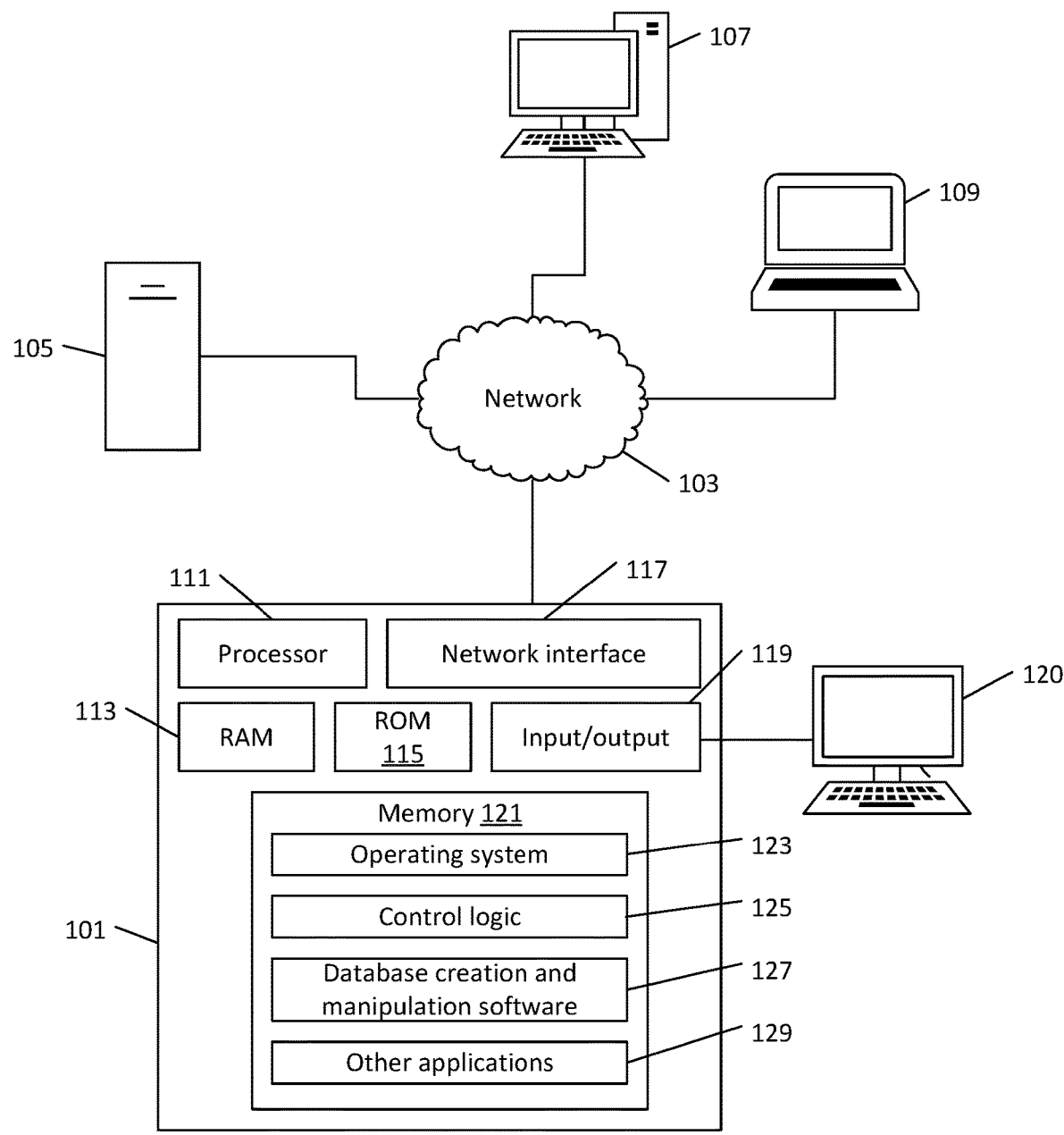
FIG. 1 depicts an example of a computing device and system architecture that may be used in implementing one or more aspects of the disclosure in accordance with one or more illustrative aspects discussed herein.

FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python or JavaScript. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for verifying an authentication capability for a service.

Figure 2:
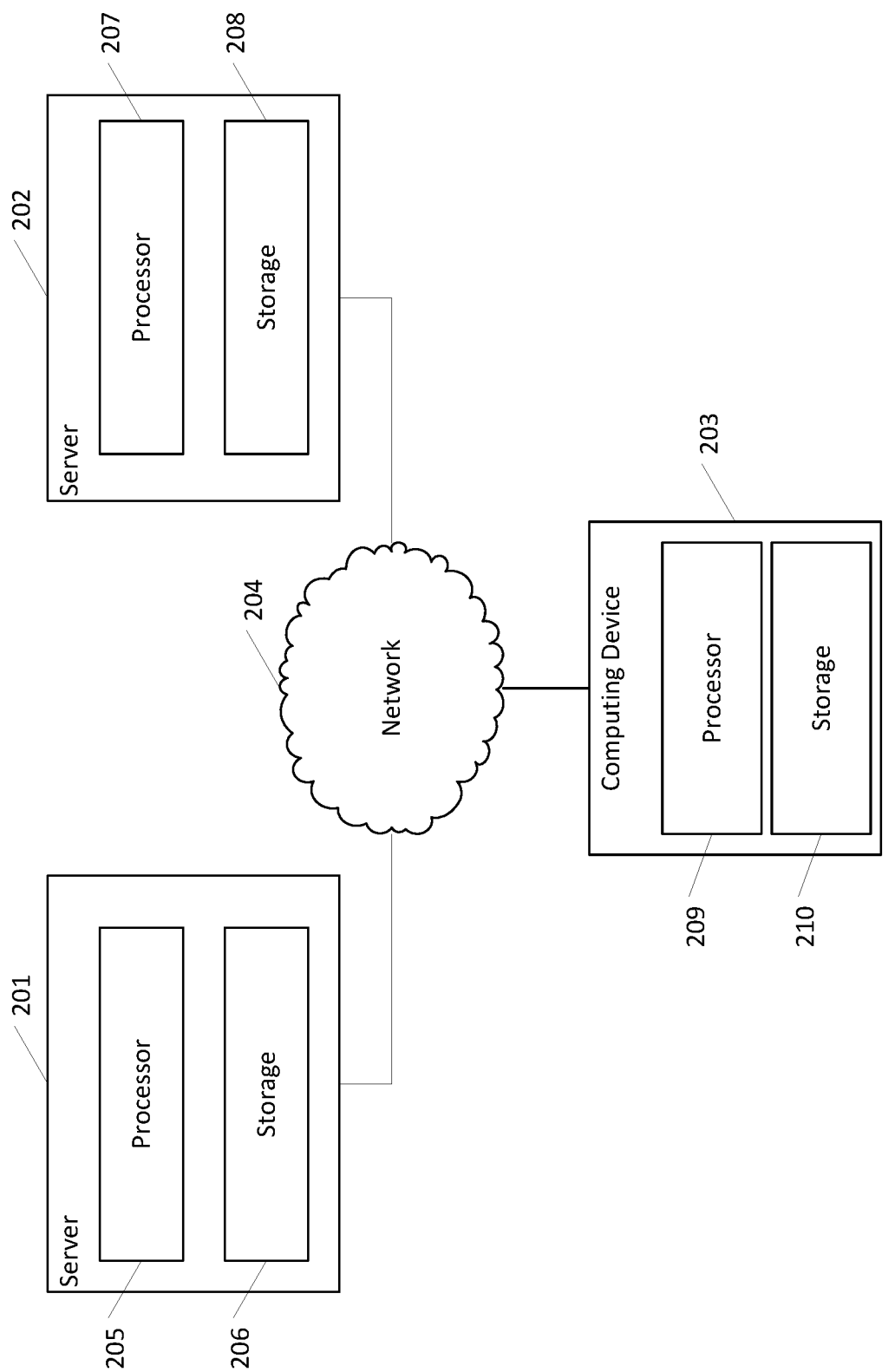
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally, or alternatively, a set of devices (e.g., one or more devices) of the environment 203 may perform one or more functions described as being performed by another set of devices of the environment. Network 204 may be represented as a single network but may comprise combinations of other networks or subnetworks.

A process of identifying files that have not been timely processed by a cloud-based platform and rerouting those files to be processed by a different cloud-based platform is described herein. For purposes of explanation, the process is described in the following sections: Cloud-based File Processing, Function Translation and Deployment, and File Tracking and Cloud Selection.

Cloud-Based File Processing

Figure 3:
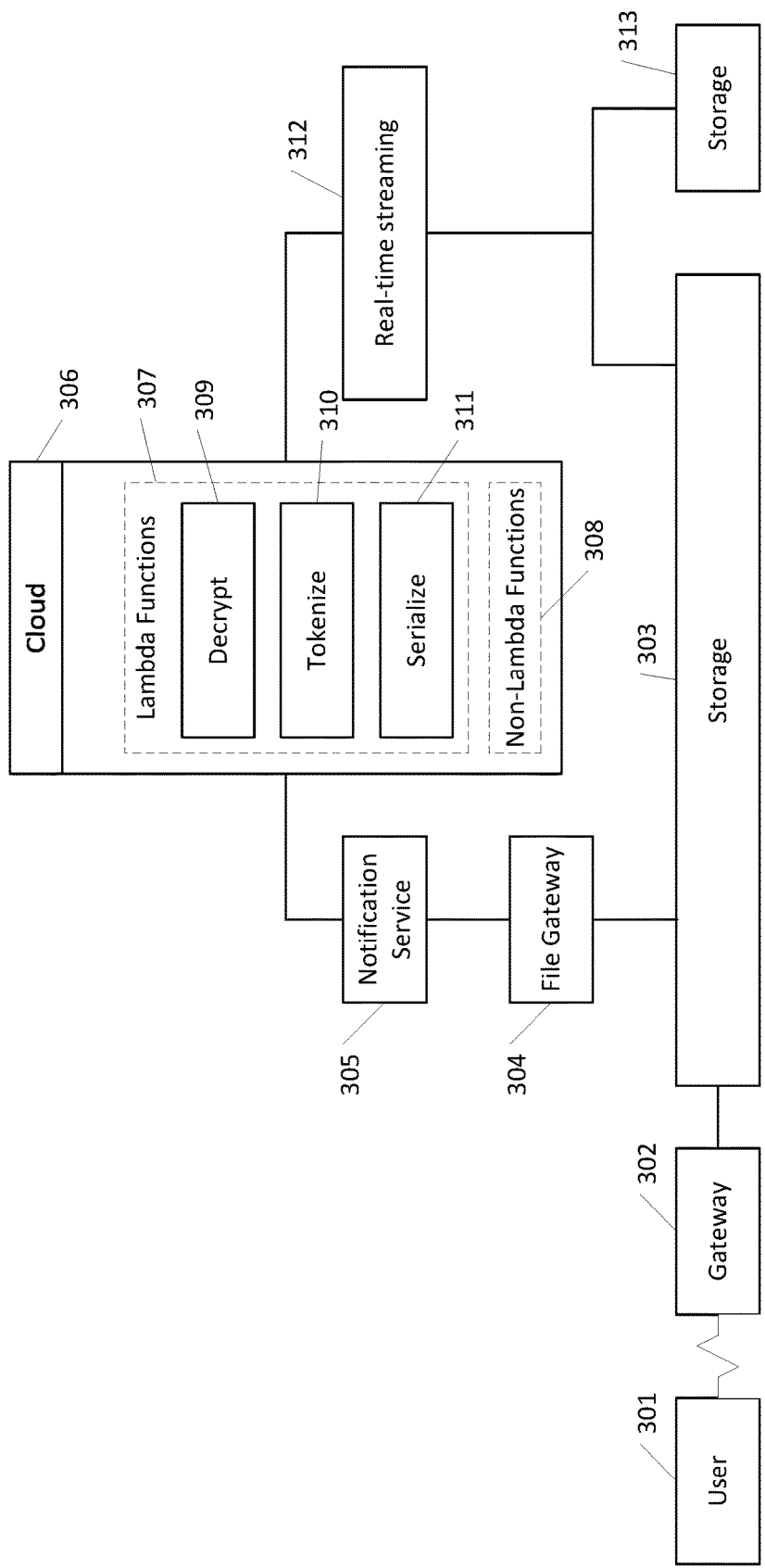
FIG. 3 depicts an environment in which a single cloud-based platform services files from a file gateway.

FIG. 3 depicts an environment in which a single cloud-based platform services files from a file gateway. FIG. 3 includes a user 301 performing various actions (seeing a doctor, filling a prescription, purchasing goods or services, and/or other transactions). Via one or more intermediaries (not shown) or even directly, the user 301's information is received by gateway 302. For purposes herein, information received by the gateway 302 may be referred to as transactions relating to groups of users 301. Each transaction may be based on an event (e.g., a purchase of a product from a merchant by a user 301), may be based on any change in information relating to the user 301 (e.g., a change in account preferences including, but not limited to, when to be billed for transactions), or may be a combination thereof. The gateway 302 may aggregate the user 301's transactions with transactions of other users. The gateway 302 may forward the aggregated transactions for handling by subsequent entities. For instance, for financial transactions (e.g., "financial transaction information") using a credit card, the gateway 302 may comprise a payment processing entity that provides payment processing services, merchant services, and/or related payment services. In one example, the gateway 302 may stream received transactions to one or more downstream processing entities. In another example, because gateway 302 may handle user transactions that are ultimately directed to different entities (e.g., to different insurance companies, lending institutions, and/or credit card issuing entities), the gateway 302 may aggregate the transactions per downstream entity (e.g., per credit card issuing entity or per bank) and forward the aggregated transactions to the appropriate downstream entity. For instance, a user 301 may seek medical treatment and changes to the client's medical records may be provided, via gateway 302, to a medical record processing system. That medical record processing system may use a cloud-based processing environment to process the changes in the client's medical records to, for example, normalize incoming changes to comport with a preexisting medical records file structure. In another example, a user 301 may purchase items from a merchant (not shown). The transaction record may be sent to a transaction clearing house to debit the user's account and credit the merchant's account.

The transaction may be received by a gateway 302 and forwarded to a storage 303. The storage 303 may forward the transaction to a file gateway 304. The storage 303 may forward the transaction as a single transaction or may group multiple transactions into a collection of transactions and forward the collection to the file gateway 304. For purposes of explanation, the information sent to the file gateway may be collectively referred to as "transaction data." The file gateway 304 may subscribe to a notification service 305 of a cloud 306 that is to process the transaction data. Notification service 305 provides, for instance, a notification that the transaction data has been processed by the cloud 306. The notification may take the form of real-time streaming of the processed transaction data, shown by a real-time streaming service 312. The real-time streams from real-time streaming service 312 may be subsequently stored, for example, in storage 303 and/or in a different storage 313. In one example, the storage 303 and/or the storage 313 may temporarily or permanently store the processed transaction data from the cloud 306. The processed transaction data 306 may additionally or alternatively be used (via one or more computing systems) to update user's information relating to the processed transaction data.

For example, records of medical services provided to a customer may have been bundled with other records in storage 303 and sent to file gateway 304 for processing via cloud 306. After the cloud 306 processes the records, the processed records may be streamed via real-time streaming service 312 for subsequent storage in storage 303 and/or in storage 313. The processed medical records may be used to update patients' medical files to allow streamlining of insurance claim processing, verification of services provided (to reduce health insurance fraud), and other record keeping items.

Cloud 306 is depicted as performing two types of functions: lambda functions 307 and non-lambda functions 308. For purposes of explanation, a lambda function 307 may be described as a small, anonymous function that may be used by higher-order functions. Examples of lambda functions shown in FIG. 3 include a decryption function 309, a tokenization function 310, and a serialization function 311. Those functions may be used by other lambda functions and/or used by non-lambda functions 308 to perform complex processing operations in cloud 306. For instance, the combination of lambda functions may generate serialized tokenized files for subsequent processing by downstream systems. FIG. 3 shows a single cloud 306 handling all processing operations for the transaction data from the gateway 302. If any of the file gateway 304, the notification service 305, the cloud 306, or the real-time streaming service 312 suffers an outage or is temporarily unreachable, the system of FIG. 3 may likely fail to process the transaction data in a timely manner. In order to address outages of the cloud 306 and/or address the cloud 306 being unreachable due to a failed communication path or paths, the systems and methods and computer-readable mediums described herein provide solutions for tracking the processing of files to ensure the efficient and timely processing of data.

Figure 4:
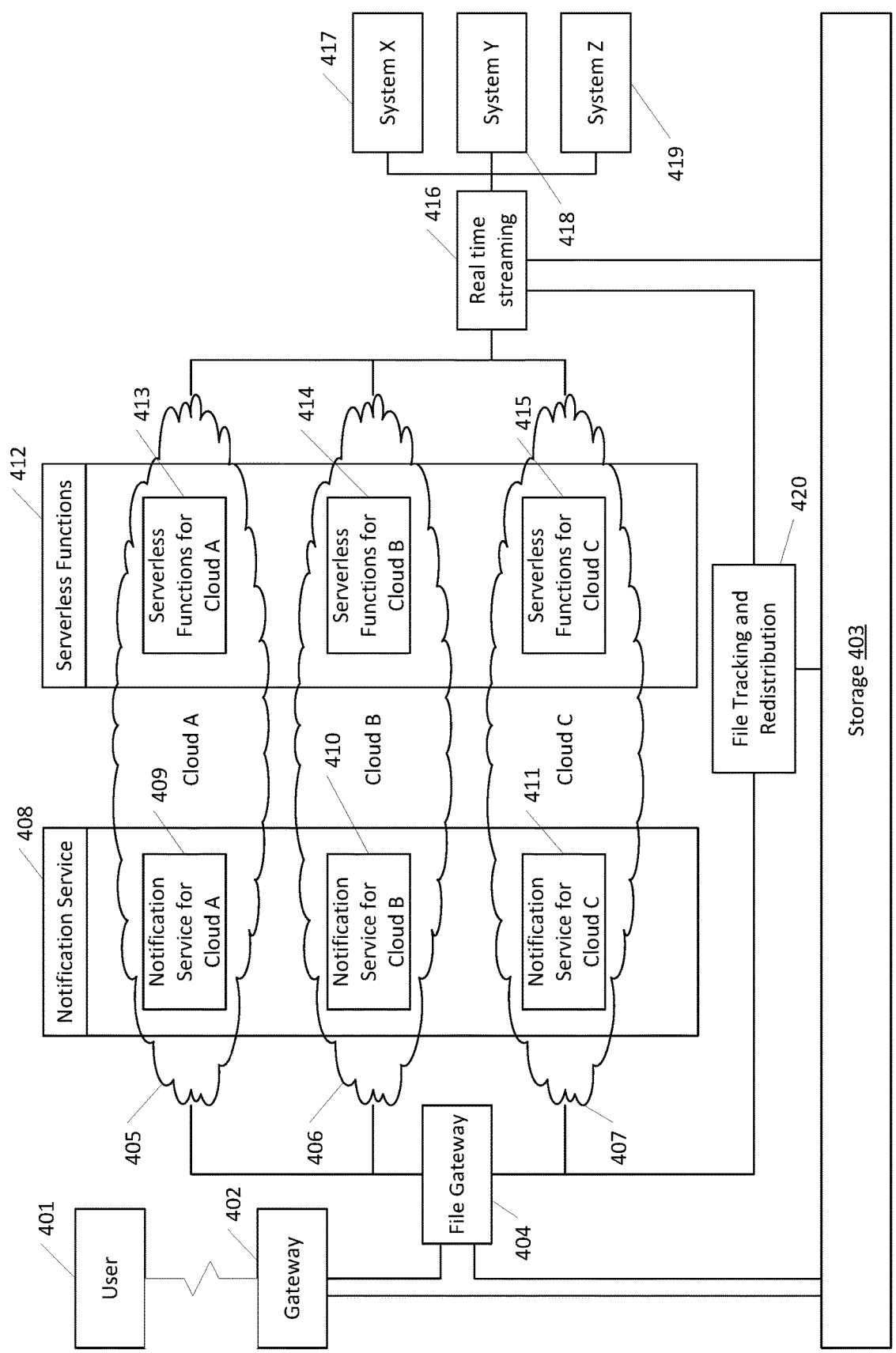
FIG. 4 depicts another environment in which multiple cloud-based platforms service files from a file gateway.

FIG. 4 depicts another environment in which multiple cloud-based platforms service transaction data from a file gateway. FIG. 4 includes a user 401 performing various actions (seeing a doctor, filling a prescription, purchasing goods or services, and/or other transactions). Via one or more intermediaries (not shown) or even directly, the user 401's transactions are received by a gateway 402. For instance, for financial transactions using a credit card, the gateway 402 may comprise a payment processing entity that provides payment processing services, merchant services, and/or related payment services. The gateway 402 may aggregate the user 401's transactions with transactions of other users. The gateway 402 may forward the aggregated transactions for handling by subsequent entities. In one example, the gateway 402 may stream received transactions, from groups of users 401, to one or more downstream processing entities. In another example, because gateway 402 may handle user transactions that are ultimately directed to different entities (e.g., to different insurance companies, lending institutions, and/or credit card issuing entities), the gateway 402 may aggregate the transactions per downstream entity (e.g., per credit card issuing entity or per bank) and forward the aggregated transactions to the appropriate downstream entity. In the example of managing health care transactions, transactions of users having a first health insurance provider may be grouped together and sent to that first health insurance provider. Similarly, transactions of users having a second health insurance provider may be grouped together and sent to that second health insurance provider. Further, the use-cases may be extended to financial transaction services as well in which, for instance, transactions of users of a first card issuer/financial institution may be aggregated and sent to that first card issuer/financial institution and transactions of users of a second card issuer/financial institution may be aggregated and sent to that second card issuer/financial institution.

Aggregated transactions may be forwarded from gateway 402 to storage 403. Storage 403 may then forward the aggregated transactions to a file gateway 404. The file gateway 404 may forward files of the aggregated transactions to one or more cloud-based processing systems. FIG. 4 depicts three cloud-based processing systems including cloud A 405, cloud B 406, and cloud C 407. It will be appreciated that more or fewer cloud-processing systems may be used. For files received from storage 403, the file gateway 404 may select one of the cloud-based processing systems and forward the received aggregated file of transactions to the selected cloud-based processing system. Additionally or alternatively, the file gateway 404 may further process the received aggregated transactions to modify the grouping of transactions as sent to a selected cloud-based processing system. For instance, the file gateway 404 may modify the aggregation of user transactions to group the transactions by various criteria, e.g., by current physical locations of the users, locations of servers handling subsequent inquiries from users, times of the users' transactions, and/or other criteria.

File gateway 404, as part of sending aggregated transactions to a selected cloud, may first subscribe to a notification service 408 for the files of aggregated transactions. For files sent to cloud A 405, the file gateway 404 may subscribe to a notification service 409 for cloud A 405. For files sent to cloud B 406, the file gateway 404 may subscribe to a notification service 410 for cloud B 406. For files sent to cloud C 407, the file gateway 404 may subscribe to a notification service 411 for cloud C 407. The notification services 409-411 may be used to associate how each cloud is to notify its customers that it has finished processing a specific file.

Each of cloud A 405, cloud B 406, and cloud C 407 may then perform various serverless functions 412 on the received files. The serverless functions 412 may perform standardized lambda functions and/or non-lambda functions (from FIG. 3) on each file. As each of cloud A 405, cloud B 406, and cloud C 407 may include its own software language and/or the variant of a commonly software language, the serverless functions 412 for each of cloud A 405, cloud B 406, and cloud C 407 may comprise different software code, while providing the same end result when processing files. For instance, cloud A 405 performs serverless functions 413 on received files, cloud B 406 performs serverless functions 414 on received files, and cloud C 407 performs serverless functions 415 on received files.

Despite the software for the service functions 413-415, of the respective clouds, being possibly different, the results of the processing by the clouds may be substantially similar or the same. The results of each cloud-based processing service may be provided, as real-time streams 416, to one or more subsequent processing systems, e.g., a system X 417, a system Y 418, and/or a system Z 419. Additionally or alternatively, the results may be streamed to storage 403 for handling by additional systems. The real-time streams may comprise data in a JavaScript Object Notation (JSON) format or an Avro format or other format. Subscribing to a notification service 305 of FIG. 3 and/or 408 of FIG. 4 may comprise identifying the output format of the real-time streams. Additionally or alternatively, the output format may be set in a lambda function deployed to the respective cloud or other output setting for the respective cloud.

FIG. 4 further includes a file tracking and redistribution service 420 that monitors to which cloud a specific file has been sent and receives notifications of when the selected cloud has completed processing of the specific file. The file tracking and redistribution service 420 may receive the stream of data from the processed file and/or may receive an indication that the specific file has been processed. The file tracking and redistribution service 420 may determine, for any file, whether the selected cloud has taken more time than desired for processing of that file. For instance, the file tracking and redistribution service 420 may store an identification of when each file was sent and to which cloud that file was sent. For files that have not completed processing by the selected cloud, the file tracking and redistribution service 420 may determine whether the elapsed time (also referred to as a time interval) for that particular cloud's processing of an individual file has exceeded a time threshold. The elapsed time may be represented by the difference between a time when the cloud started streaming the results of processing a file and a time when the file was sent to the cloud. Where the cloud has not completed processing a file, the elapsed time may be measured as a difference between a current time and the time when the file was sent to the cloud. If the elapsed time is greater than or equal to a time threshold and the cloud has not completed processing of the file, the file tracking and redistribution service 420 may instruct file gateway 404 to submit the file to a different cloud for processing using the serverless functions 412. The slowdown of processing throughput of a given cloud including the cloud being one or more of unreachable and/or unable to otherwise process a received file may be collectively referred to as "backpressure." If a cloud is taking longer than usual to process a file, the cloud may be referred to as experiencing some backpressure. If the cloud is taking much longer than usual to process a file or the cloud is unresponsive, the cloud may be referred to as experiencing significant backpressure.

The file tracking and redistribution service 420 may instruct the file gateway 404 via one or more approaches that may be used alone or in combination. First, the file tracking and redistribution service 420 may directly instruct file gateway 404 to process a file that has not been completed by a selected cloud. For instance, the file tracking and redistribution service 420 may include a record of all files sent to file gateway 404 and to which cloud each file was forwarded for processing. Additionally or alternatively, the file tracking and redistribution service 420 may update an entry for that file in the storage 403 (e.g., update a status table of files). The updated entry may indicate that the particular file needs to be reprocessed by file gateway 404 and sent to another cloud for processing.

FIG. 4 depicts multiple transmission paths (including direct and indirect) between file tracking and redistribution service 420 and other components. For instance, real-time streaming service 416 may provide status information regarding completed files directly to file tracking and distribution service 420 and/or may only forward that information to storage 403. Similarly, files transmitted by file gateway 404 to clouds 405-407 may be sent directly to file tracking and redistribution service 420 and/or to storage 403. If only sent to storage 403, the location and times at which a particular file was sent by file gateway 404 may be forwarded from storage 403 to the file tracking and redistribution service 420.

Figure 5:
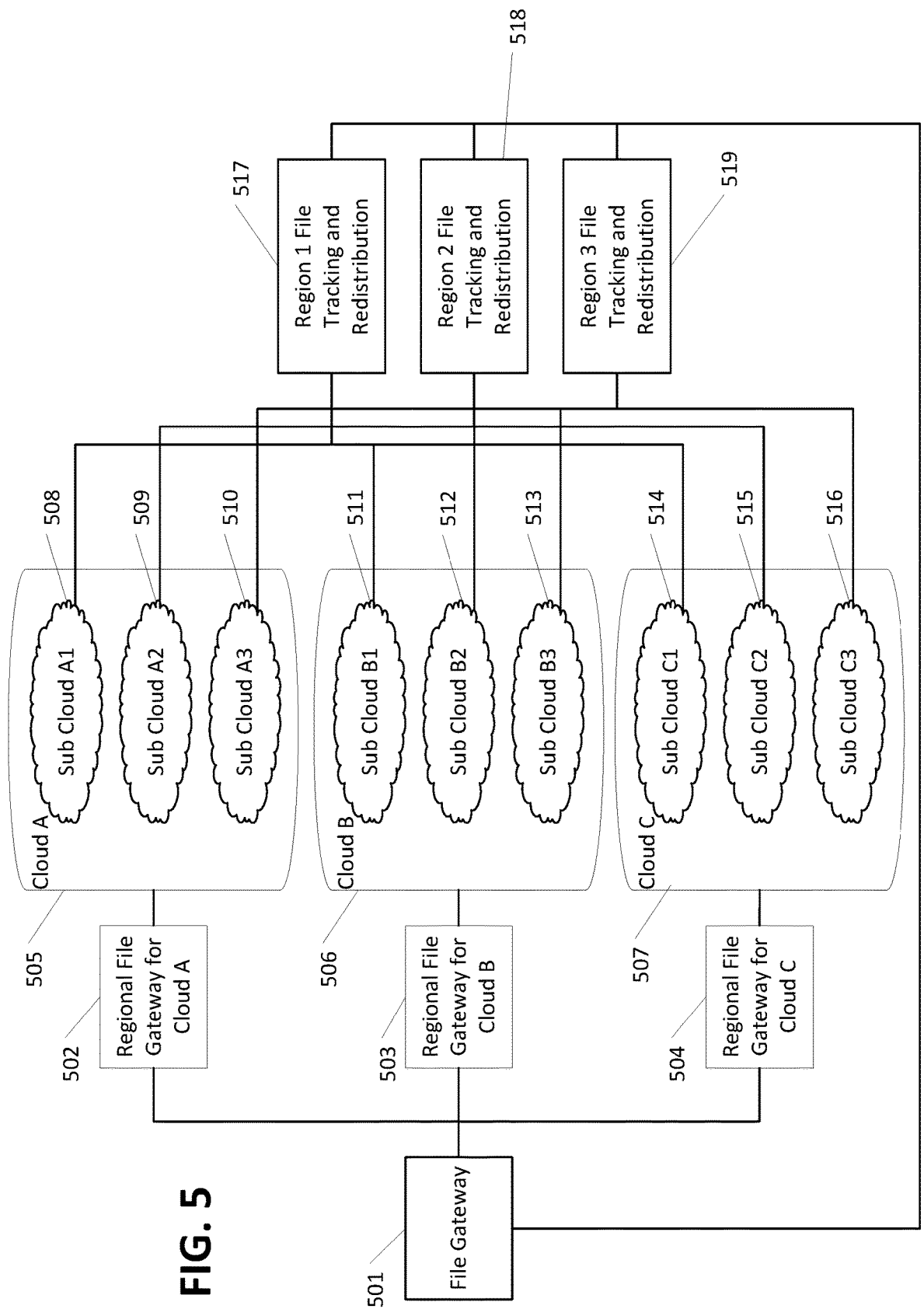
FIGS. 5-7 depict various tracking examples for clouds with regional sub clouds.
Figure 6:
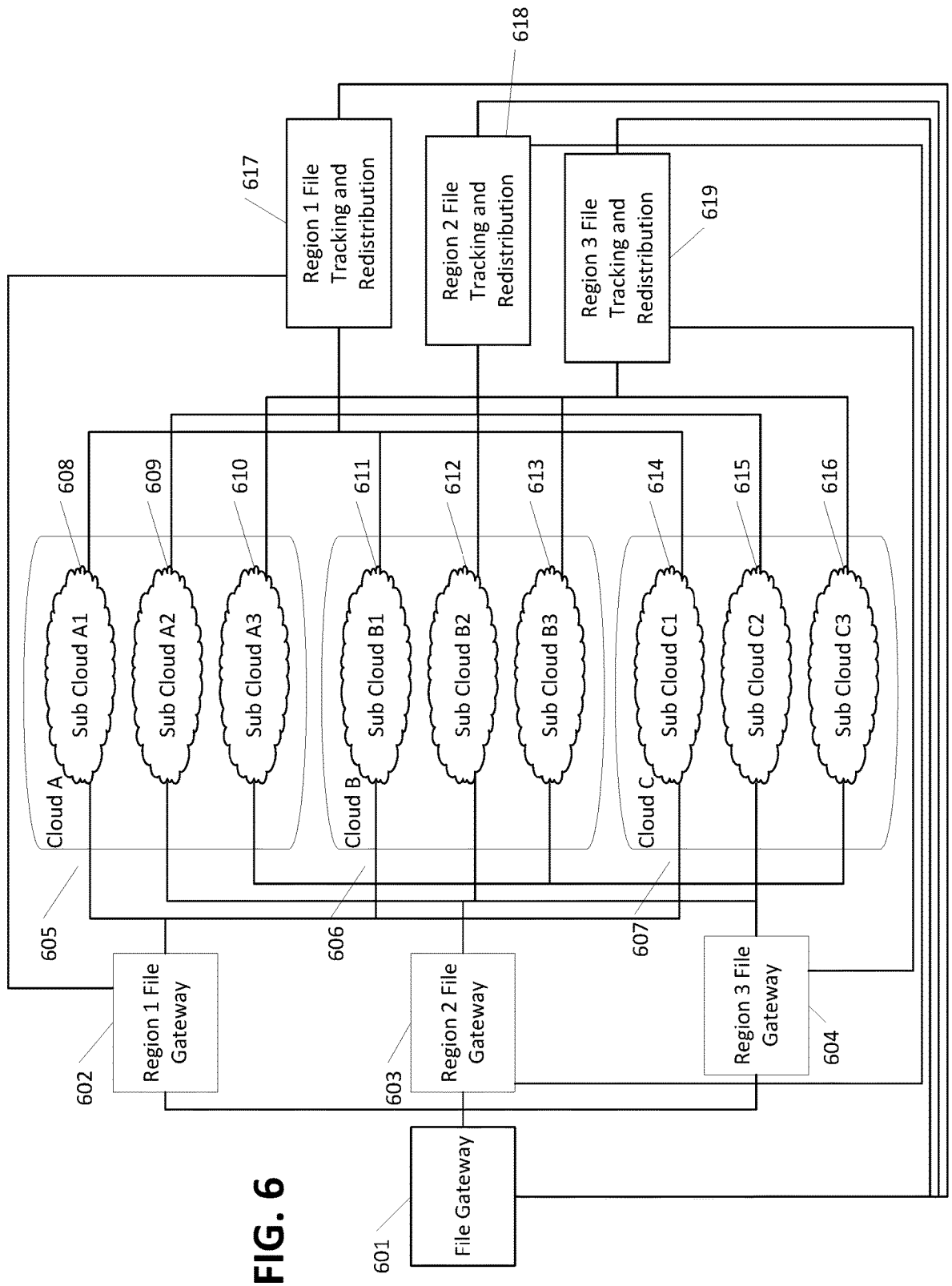
Figure 7:
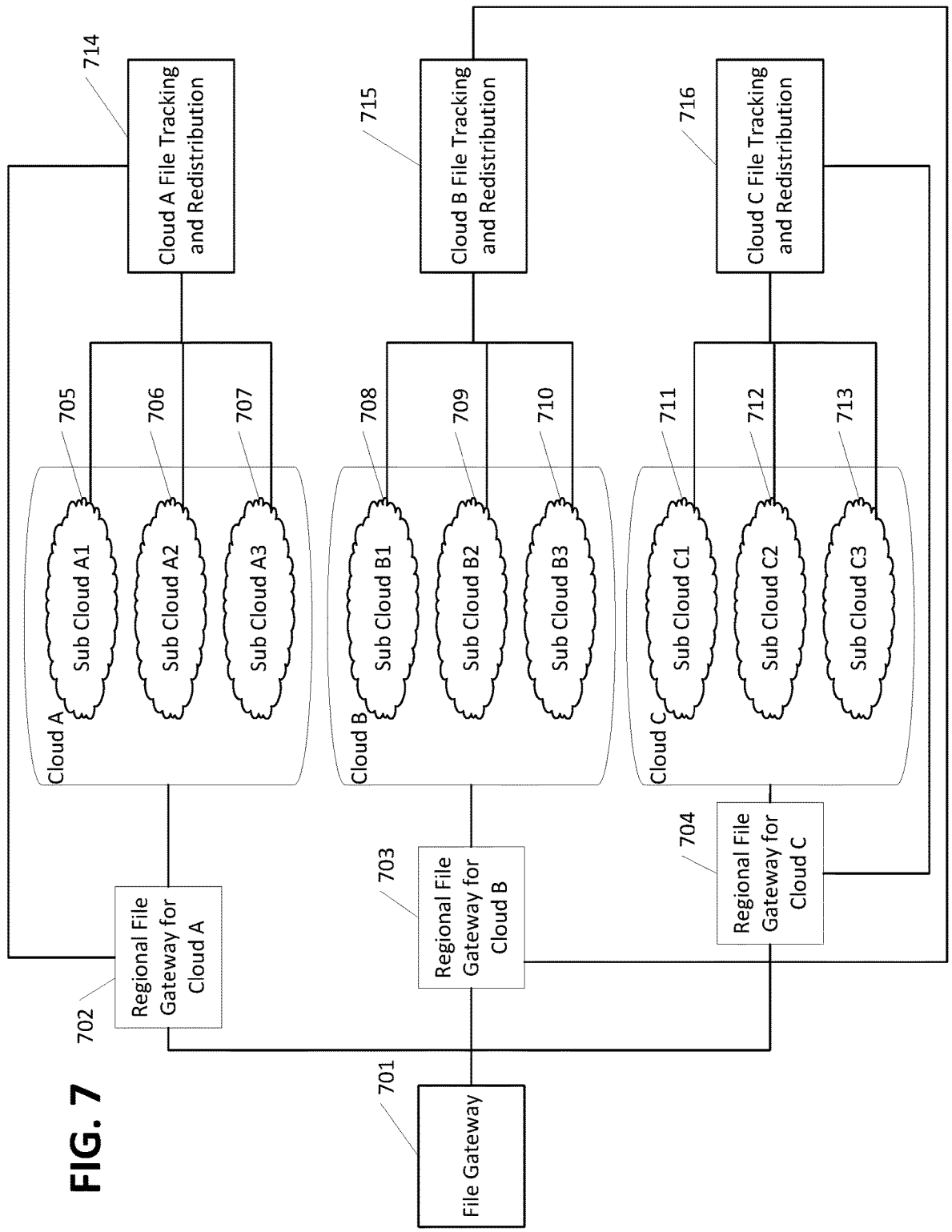

Additionally or alternatively, the file tracking and redistribution service 420 may decide, for each file in storage 403 received from gateway 402, to which cloud to initially send the particular file. The file tracking and redistribution service 420 may record when file gateway 404 was instructed to forward the file and/or, based on an acknowledgment from file gateway 404, when the actual file was sent to a particular cloud service. Each of clouds 405-407 may be treated by file tracking and redistribution service 420 as individual clouds. Additionally or alternatively, the file tracking and redistribution service 420 may treat each individual cloud as a collection of smaller clouds. In FIG. 4, one file tracking and redistribution system 420 monitors the real time streams 416 from all clouds 405-407. Alternatively or additionally, other file tracking and redistribution systems may be used as well where the other file tracking and redistribution systems are dedicated to a particular cloud and/or region. FIGS. 5-7 show examples of multiple file tracking and redistribution systems interacting with various regions handled by sub clouds of clouds.

FIG. 5 depicts various tracking examples for clouds with regional sub clouds. A file may be received by file gateway 501 and forwarded to a regional file gateway for a particular cloud. The regional file gateway may identify, for a given cloud, a region from which a file originated and forward the file to the respective sub cloud of a given cloud. For instance, a regional file gateway 502 may select and forward, for cloud A 505, the received file to one of sub clouds A1-A3 508-510. Similarly, a regional file gateway 503 may select and forward, for cloud B 506, the received file to one of sub clouds B1-B3 511-513. A regional file gateway 504 may select and forward, for cloud C 507, the received file to one of sub clouds C1-C3 514-516. Once the sub clouds A1-A3 508-510, B1-B3, 511-513, and C1-C3 514-516 have completed processing of received files, the results may be provided as real-time streams of data as represented by real-time streams 416 of FIG. 4. FIG. 5 includes a region 1 file tracking and redistribution system 517 (e.g., one or more servers) that tracks the status of files sent to sub clouds associated with region 1 (e.g., sub clouds A1 508, sub cloud B1 511, and sub cloud C1 514). A region 2 file tracking and redistribution system 518 (e.g., one or more servers) may track the status of files sent to sub clouds associated with region 2 (e.g., sub clouds A2 509, sub cloud B2 512, and sub cloud C2 515). A region 3 file tracking and redistribution system 519 (e.g., one or more servers) may track the status of files sent to sub clouds associated with region 3 (e.g., sub clouds A3 510, sub cloud B3 513, and sub cloud C3 516). If the sub cloud has not completed processing of the file within a time threshold (e.g., 5 milliseconds, 50 milliseconds, 5 minutes, etc.), the respective region file tracking and redistribution system 517-519 may alert file gateway 501 that the particular file has not been processed within a threshold. The file gateway 501 may forward the particular file (e.g., from a local storage or from another storage—e.g., from storage 403 of FIG. 4) to a regional gateway for another cloud to be handled by the regional sub cloud for that other cloud. For instance, if sub cloud A1 508 has not completed processing of a given file by a time threshold, the region 1 file tracking and redistribution system 517 may alert file gateway 501 that the file was not processed within the time threshold. File gateway 501 may forward a copy of the file from a storage (not shown in FIG. 5) (e.g., from storage 403 of FIG. 4) to the regional file gateway 504 for cloud C. The regional file gateway 504 may forward the file to a sub cloud (e.g., sub cloud C1 514) in the same region from which the file originated (e.g., region 1). In FIG. 5, the file gateway 501 may determine to have a file that was not timely completed by one sub cloud to be reprocessed by the same cloud but in a different region (sub cloud) of that cloud, to be reprocessed by a different cloud in the same region, or to be processed by the different cloud in a different region).

FIG. 6 depicts another tracking example for clouds with sub clouds. FIG. 6 comprises a file gateway 601 and regional file gateways 602-604. The regional file gateways 602-604 are not dedicated to a particular cloud as are the regional file gateways 502-504 shown in FIG. 5. Rather, each of the regional file gateways 602-604 may forward files to any sub cloud associated with its region. For instance, the region 1 file gateway 602 may forward received files to any of sub clouds A1 608, B1 611, and C 1 614. The region 2 file gateway 603 may forward received files to any of sub clouds A2 609, B2 612, and C2 615. The region 3 file gateway 603 may forward received files to any of sub clouds A3 609, B3 612, and C3 615. Region 1 file tracking and redistribution 617, region 2 file tracking and redistribution 618, and region 3 file tracking and redistribution 619 may track files sent to sub clouds within their respective regions. If a sub cloud has not processed a file within a time threshold (e.g., 5 milliseconds, 50 milliseconds, 5 minutes, etc.), the respective region file tracking and redistribution system 617-619 may alert file gateway 601 that the particular file has not been processed within the threshold. The file gateway 601 may forward the particular file (e.g., from a local storage or from another storage—e.g., from storage 403 of FIG. 4) to the original region gateway for sending to another sub cloud in that region. For instance, if sub cloud A1 608 has not completed processing of a given file by a time threshold, the region 1 file tracking and redistribution system 617 may alert file gateway 601 that the file was not processed within the time threshold. File gateway 601 may forward a copy of the file from a storage (not shown in FIG. 5) (e.g., from storage 403 of FIG. 4) to the region 1 file gateway 602 with an indication to send the file to sub cloud B1 611 or sub cloud C1 614.

Additionally or alternatively, the region file gateway 602-604 may receive the indication from its respective region file tracking and redistribution system 617-619 that a file has not been processed within a time threshold and forward a copy of the file to another cloud in the region to process the file. For example, the region 1 file gateway 602 may receive the indication from the region 1 file tracking and redistribution system 617 that the file has not been processed within the time threshold. The region 1 file gateway 602 may determine to which sub cloud it previously forwarded the file and select another sub cloud in that region. The determination may be based on sub cloud information from the region 1 file tracking and redistribution system 617 or may be based on internal records of the time at which and the sub cloud to which it forwarded the file.

In the example of FIG. 6, the region file gateways 602-604 may attempt to keep files to be processed within the respective region from which each file originated and/or where the processed information from the files is to be stored. The regions may include geographic regions including, for instance, countries, divisions of countries, and/or groups of countries. Additionally or alternatively, the regions may be based on financial networks (e.g., one type of clearinghouse compared to another) and/or based on physical networks, and the like. In FIG. 6, working together or separately, the file gateway 601 and/or the regional file gateways 602-694 may determine to have a file that had not completed processing by one sub cloud of a cloud to be reprocessed by the same cloud but in a different region (sub cloud) of that cloud, a different cloud in the same region, or the different cloud in a different region. In the example where the regional file gateways 602-604 receive a notice from the related regional file tracking and redistribution system 617-619, the regional file gateways 602-604 may select another sub cloud or sub clouds handling their region and forward the files for reprocessing to the newly selected sub cloud or sub clouds.

FIG. 7 depicts yet another example of tracking files that are being processed by clouds with sub clouds. A file may be received by a file gateway 701. The file gateway 701 may select one of the regional file gateways 702-704 for one of clouds A, B, or C and forward the file to the selected regional file gateway. Cloud A includes three regional sub clouds A1 705, A2 706, and A3 707. Cloud B includes three regional sub clouds B1 708, B2 709, and B3 710. Cloud C includes three regional sub clouds C1 711, C2 712, and C3 713. The selected regional file gateway of the regional file gateways 702-704 may forward the file to a regional sub cloud of the cloud related to that regional file gateway. Once the sub cloud has completed processing of the file, the file is streamed to a destination (not shown) (e.g., via real-time streaming 416 of FIG. 4). FIG. 7 includes a file tracking and redistribution system 714 for monitoring files processed by the sub clouds A1-A3 705-707 of cloud A, a file tracking and redistribution system 715 for monitoring files processed by the sub clouds B1-B3 708-710 of cloud B, and a file tracking and redistribution system 716 for monitoring files processed by the sub clouds C1-C3 711-713 of cloud C. If a sub cloud does not complete the processing of a file within a predetermined time threshold, the related file tracking and redistribution systems 714-716 may alert their respective regional file gateways 702-704 to have the file reprocessed by a different sub cloud (i.e., handling a different region) of their respective cloud.

Function Translation and Deployment

Figure 8:
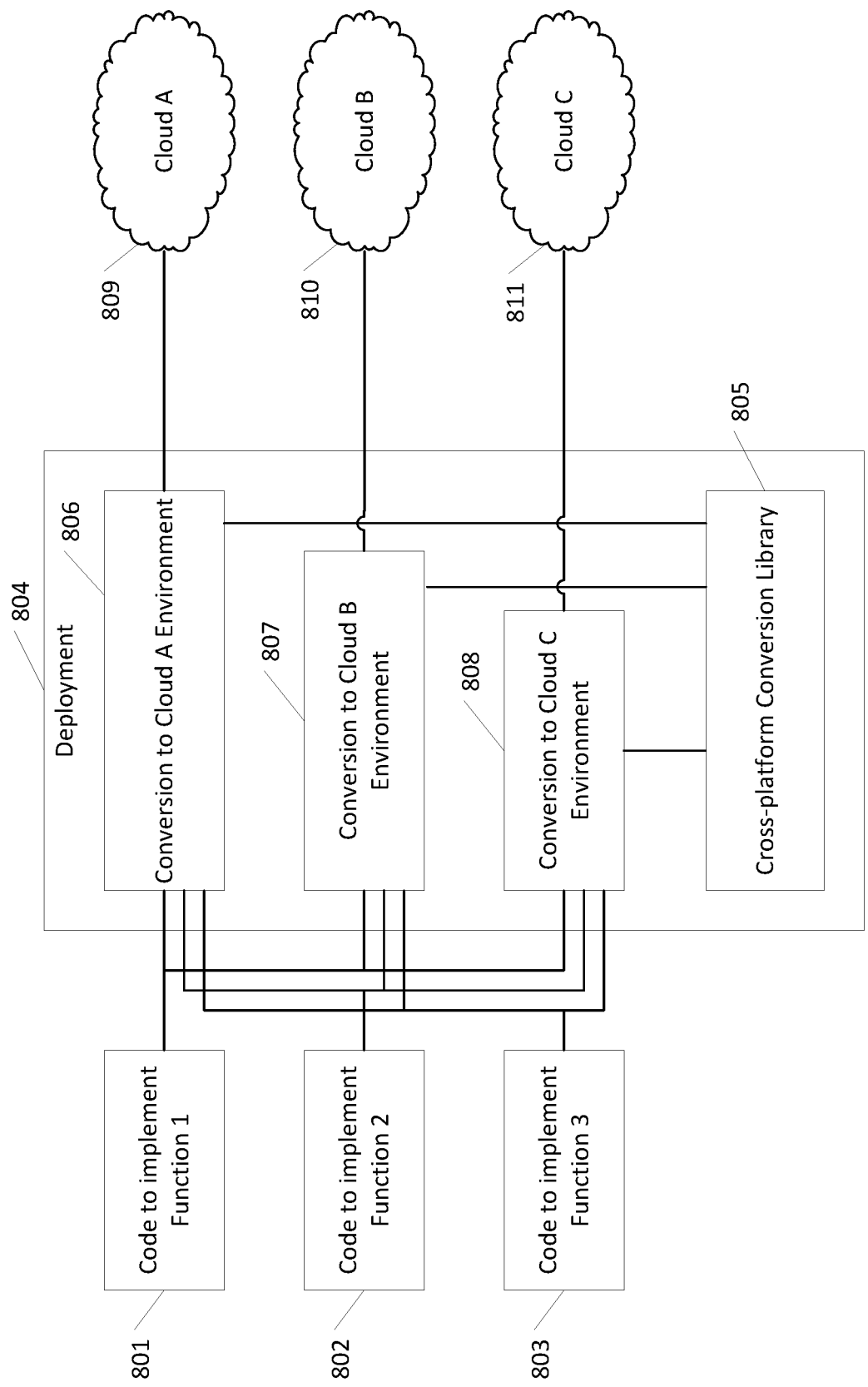
FIG. 8 depicts a process of converting general functions into software code to be executed on different cloud-computing platforms.

FIG. 8 depicts a process of converting general functions into software code to be executed on different cloud-computing platforms. Developers may attempt to generate software code for each cloud independently. The cloud-specific code may be represented by non-lambda functions 308 of FIG. 3. While those non-lambda functions may be required for each cloud, learning and documenting each separate set of code may become tedious. FIG. 8 assists those developers by abstracting the software code to be run in each cloud by permitting the developers to develop at least some of the software code as simpler lambda functions that may be interpreted and deployed across the various clouds. The developers may generate system-agnostic instructions that, when deployed to specific clouds, are in the form of system-specific instructions. For example, software code representing a first lambda function is represented by code 801, software code representing a second lambda function is represented by code 802, and software code representing a third lambda function is represented by code 803. Each of code 801-803 is forwarded to a deployment process 804 in which each code 801-803 is converted to a platform-specific version of the code. For example, the deployment process 804 may comprise a first process 806 that converts received code, using information and processes stored in a cross-platform conversion library 805, into code specific for execution in cloud A 809. The cross-platform conversion library 805 may comprise deployment instructions that instruct how to modify the system-agnostic code into platform-specific code. Similarly, the deployment process 804 may comprise a second process 807 that converts received code, using the information and processes stored in a cross-platform conversion library 805, into code specific for execution in cloud B 810. Finally, the deployment process 804 may comprise a third process 808 that converts received code, using the information and processes stored in a cross-platform conversion library 805, into code specific for execution in cloud C 811. The resulting cloud-specific versions of the functions, based on the conversion processes 806-808, are deployed to respective clouds A-C 809-811.

Additionally or alternatively, the software code 801-803 may be deployed in containers that run on virtual machines in each environment. For example, the software code 801-803 may be provided in containers that may be dockerized (e.g., via dockerizing a Node.js application to be executable on various platforms in accordance with extensible services provided by Docker Inc. at www.docker.com).

File Tracking and Cloud Selection

FIG. 9 is an example of a dataset that may be used to track and coordinate processing of files by different cloud-computing platforms. The dataset may exist at one location or may be replicated and accessed at multiple locations. Further, the dataset may be segmented by region and/or by cloud. For instance, the dataset or portions of the dataset may be resident in storage 403, the file tracking and redistribution system 420, in the file gateway 404 and/or in other locations of FIG. 4. Additionally or alternatively, the dataset or portions of the dataset may be resident in file gateway 501, in the regional file gateways 502-504, and/or in the regional file tracking and redistribution systems 517-519 of FIG. 5. Additionally or alternatively, the dataset or portions of the dataset may be resident in file gateway 601, in the regional file gateways 602-604, and/or in the regional file tracking and redistribution systems 617-619 of FIG. 6. Additionally or alternatively, the dataset or portions of the dataset may be resident in file gateway 701, in the regional file gateways 702-704, and/or in the regional file tracking and redistribution systems 714-716 of FIG. 7.

The dataset of FIG. 9 may comprise one or more fields including a file identification field (e.g., "File ID"), a field identifying a time at which a file was received (e.g., "Time File Received TR"), a field identifying the selected cloud to which the file was sent (e.g., "Selected Cloud"), a field identifying a time at which a file was sent to the selected cloud (e.g., "Time Sent to Cloud TC"), a field identifying whether the cloud has completed processing of the file (e.g., "Finished?"), a field identifying whether, compared to a current time, whether the processing of the file has taken longer than a time threshold (e.g., "Too long? TC-Current Time≥Threshold?"), a field indicating whether the cloud has completed processing of the file (e.g., "Time Finished TF"), a field indicating whether the file needs to be reprocessed in another cloud (e.g., "Reprocess in Other Cloud?"), and/or a field indicating a presence and/or absence of backpressure associated with the cloud (e.g., "Backpressure?"). The dataset of FIG. 9 may be stored as a table and/or other data structure as needed. One or more of the fields of the dataset of FIG. 9 may be stored separately but updated based on the existence of other data in the dataset. For example, the backpressure field may be stored in a separate dataset and simplified to a current backpressure dataset that is kept current based on a most resent row or rows from the dataset of FIG. 9. That backpressure dataset may be consulted when a file gateway and/or a regional file gateway is selecting another cloud or another sub cloud to process the file or to reprocess the file.

The following provides an example of how the dataset of FIG. 9 is populated and used to manage the processing of files. File 01 was received at a gateway or storage at time P. Cloud A was selected and the file sent to cloud A at time U. The file has completed processing by cloud A at time E and the processing time was less than a time threshold. Because the file was processed within the time threshold and because cloud A completed processing of the file, file 01 was not processed in another cloud and no backpressure was felt from cloud A. File 02 was received at time Q and processed by cloud C. It was sent to cloud C at time V and received back at time F and was processed within the time threshold. The file was not reprocessed by another cloud and no backpressure was felt by cloud C. File 03 was received at time R and sent, at time W, to cloud A for processing. Cloud A did not complete processing of file 03 by a current time and a time threshold had past so the file was designated for reprocessing in another cloud (e.g., "Reprocess in another cloud?"="Yes"). Because cloud A did not process the file 03 within the time threshold, cloud A was identified as exhibiting backpressure as of the time the file 03 was sent to cloud A plus the time threshold (=TC+$T_{threshold}$). Similarly, file 04 was received at time S and sent, at time X, to cloud B for processing. Cloud B did not complete processing of file 04 by a current time and the time threshold had passed so the file was designated for reprocessing in another cloud (e.g., "Reprocess in another cloud?"="Yes"). Because cloud B did not process the file 04 within the time threshold, cloud B was identified as exhibiting backpressure as of the time the file 04 was sent to cloud B plus the time threshold (=TC+ $T_{threshold}$). It is appreciated that the current time continually changes. Including the time threshold $T_{threshold}$ permits the system to evaluate real-time delays and to attempt to accommodate for potential issues causing those delays (e.g., cloud-based issues including outages caused by a cloud or a sub cloud being down and communication-based issues where a region encompassing sub clouds of multiple clouds is unreachable or facing transmission delays or a combination of both types of issues or even other issues) and providing solutions when cloud-based services are experience downtime. For example, backpressure for a particular cloud (e.g., from a particular cloud provider) may be indicative of an outage or particular problem with the cloud provider. Using information regarding the existence of backpressure in the dataset of FIG. 9, the file gateway and/or the file tracking and redistribution system or systems may temporarily reroute files to other cloud providers until the outage or issue with the particular cloud provider has been resolved.

While files 03 and 04 were being processed, file 05 was received at time T. File 05 was sent, at time Y, to cloud D for processing. Cloud D finished processing (e.g., "Finished?"="Yes") but did not complete the processing of the file 05 within the time threshold. While file 05 did not need to be reprocessed because it was received, for instance, shortly after the end of the time threshold after having been sent to cloud D, cloud D is identified as of the time received G as experiencing backpressure.

Once files 03 and 04 are designated for being reprocessed, the dataset of FIG. 9 may be updated in a variety of ways. In one approach, reprocessing information may be added as extra fields to the row of each of files 03 and 04. Additionally or alternatively, the files 03 and 04 may be added as new rows in the dataset and their information added as if they were newly received files. For instance, the received time for the file to be reprocessed may be the time at which the file was identified as needing to be reprocessed and/or the time at which the processing of the file exceeded the time threshold after the time TC when sent to the originally selected cloud. As shown in the dataset of FIG. 9, there are no entries for "Reprocess in Other Cloud?" for the reprocessing of files 03 and 04 as the time threshold $T_{threshold}$ has not elapsed after the times the files were sent to the selected clouds.

Figure 10:
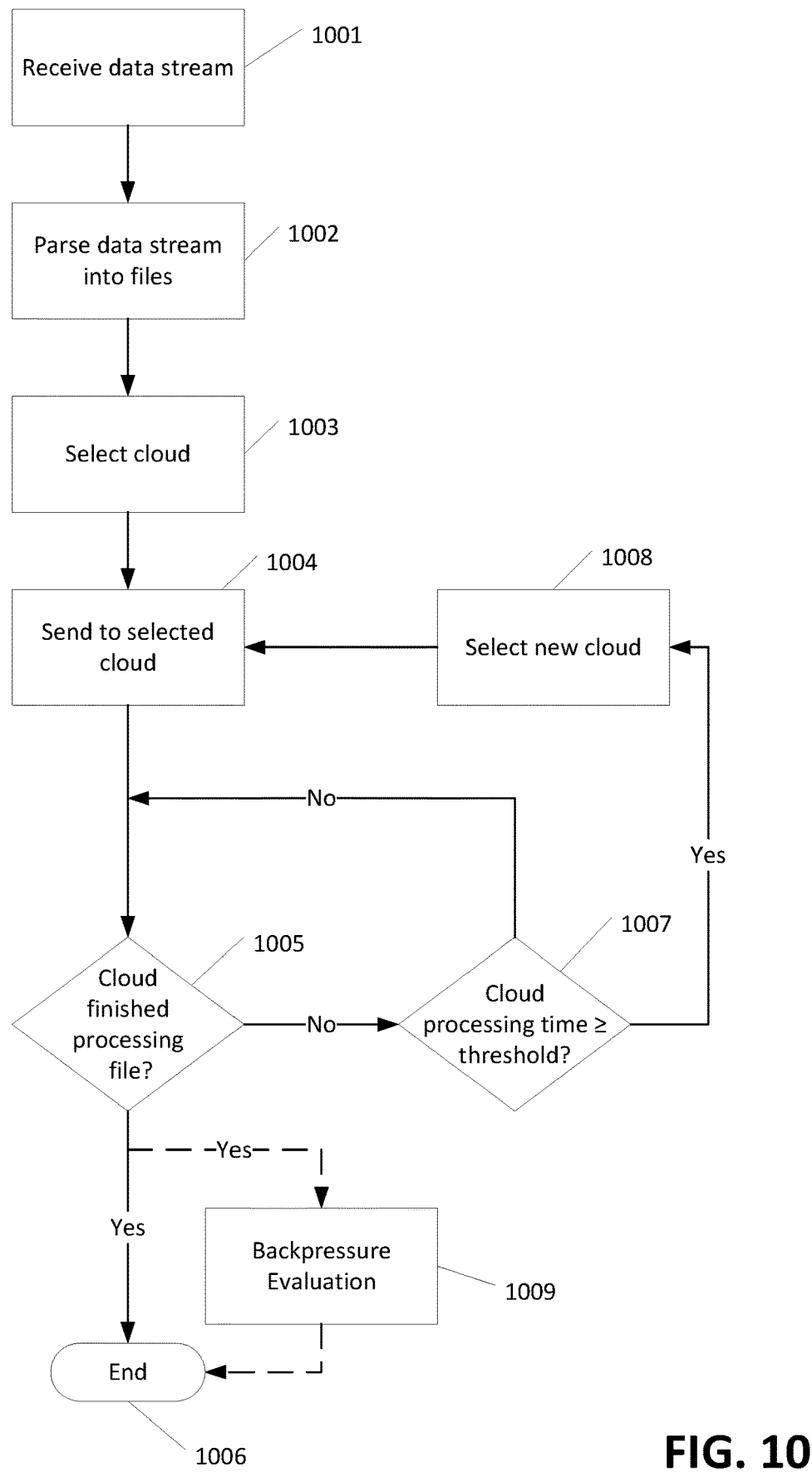
FIG. 10 depicts a process for coordinating processing of files across cloud-computing platforms.

FIG. 10 depicts a process for coordinating processing of files across cloud-computing platforms. In step 1001, a data stream is received with content. In step 1002, the data stream is parsed into separate files. The parsing may occur, for instance, in the gateway 402 of FIG. 4. In step 1003, a cloud is selected for the processing of the parsed file. In step 1004, the file is sent, e.g., via file gateway 404 of FIG. 4, to the selected cloud. In step 1005, the system determines whether the cloud has completed processing of the file. If the cloud has completed processing of the file, the process for tracking that particular file ends in step 1006. If the cloud has not completed processing of the file as determined in step 1005, the system determines whether the cloud processing time is greater than or equal to a time threshold in step 1007. The cloud processing time may be determined by comparing a current time with the time threshold added to a time at which the file was sent to a particular cloud. If the cloud processing time is determined in step 1007 to be less than the time threshold, the process continues to check in step 1005 whether the selected cloud has completed processing of the file. If the cloud processing time is determined in step 1007 to be greater than or equal to the threshold, then a new cloud is selected in step 1008 and the file is sent to the newly selected cloud in step 1004. The selection of the new cloud in step 1008 may comprise reading fail-over instructions that define which alternate cloud or sub cloud or region should be selected or an order in which the clouds/sub clouds/regions are to be selected. The ordered fail-over instructions may identify one or more variables that adjust the order in which the next cloud, sub cloud, or region should be selected for processing of a file. Alternatively or additionally, the system may determine, in step 1009, after the system determined in step 1005 that the selected cloud has completed processing of the file, whether any backpressure exists in the selected cloud. The determination of whether any backpressure exists may be based on the time difference between the sending of the file to the cloud for processing and when the cloud completed processing of the file. The indication of backpressure may be stored in the dataset of FIG. 9 and/or may be stored separately.

Figure 11:
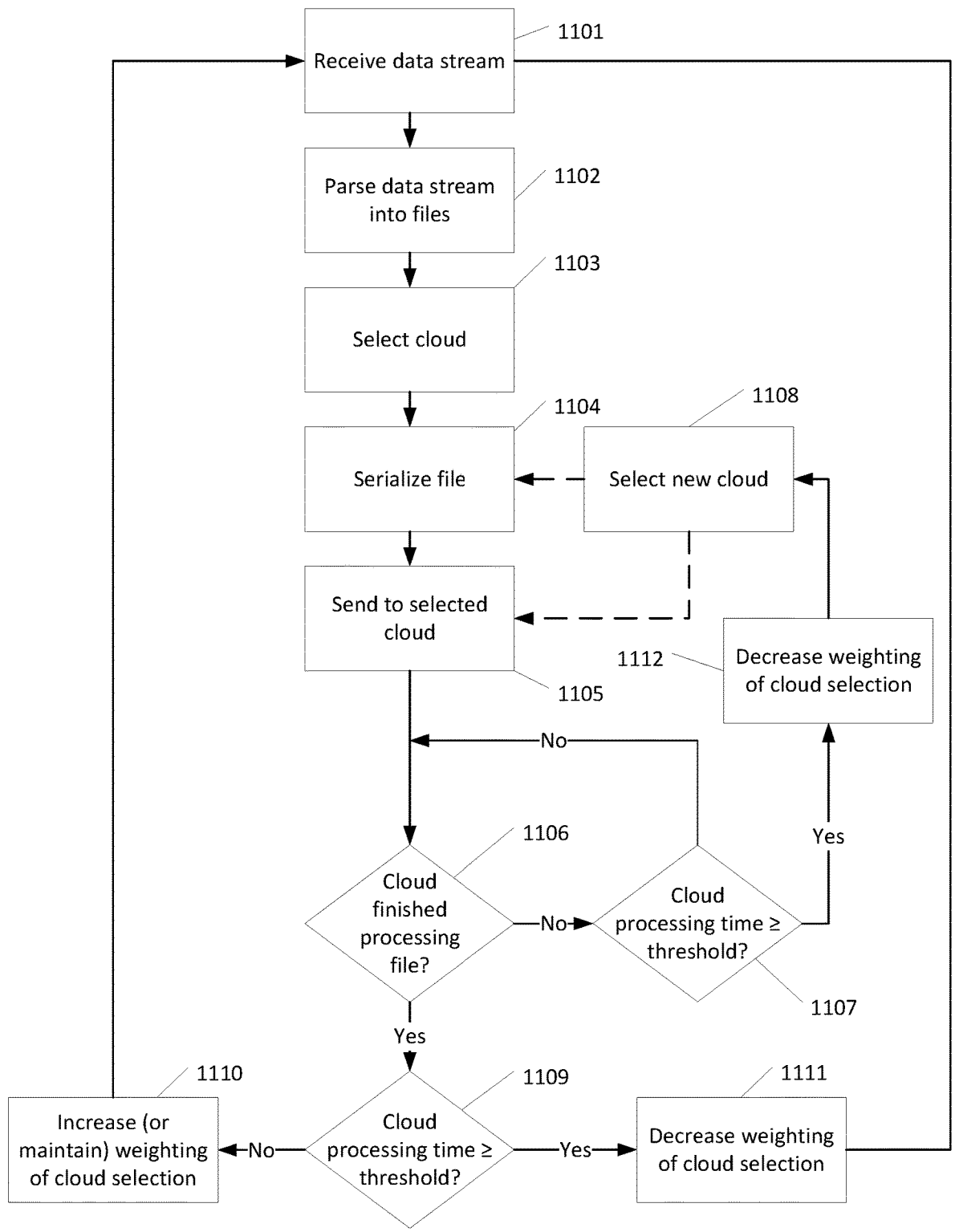
FIG. 11 depicts another process for coordinating processing of files across cloud-computing platforms.

FIG. 11 depicts another process for coordinating processing of files across cloud-computing platforms. In step 1101, a data stream is received with content. In step 1102, the data stream is parsed into separate files. The parsing may occur, for instance, in the gateway 402 of FIG. 4. In step 1103, a cloud is selected for the processing of the parsed file. In step 1104, the file is serialized for forwarding to the selected cloud. Additionally or alternatively, the selection of the cloud in step 1103 and the serialization of the file in step 1104 may be performed in parallel or in any order.

In step 1105, the file is sent, e.g., via file gateway 404 of FIG. 4, to the selected cloud.

In step 1106, the system determines whether the cloud has completed processing of the file. If the cloud has completed processing of the file, the system determines in step 1109 whether the cloud processing time for the file exceeded a time threshold. If the threshold was not exceeded, the process concludes in step 1110 for monitoring the file by increasing a weighting factor (or maintaining the weighting factor) of the cloud selection step 1103 and the process returns to continue to receive other data streams in step 1101. If the cloud processing time was determined, in step 1109, to exceed the threshold, the weighting factor relating to selecting that cloud over other clouds may be adjusted in step 1111 to bias in favor of other clouds and the process returns to continue to receive other data streams in step 1101. It is appreciated that the file monitoring and reprocessing operations of FIGS. 10 and 11 may be performed serially or in parallel for files transmitted to clouds for processing.

In step 1106, if the process determined that the cloud had not completed processing of the file, then the process determines, in step 1107, whether the cloud processing time is greater than or equal to the processing time threshold. If the cloud processing time threshold is less than the processing time threshold, the process returns to step 1106 to monitor for the completion of the processing of the file. If the cloud processing time exceeds the processing time threshold as determined in step 1107, then the file needs to be reprocessed as the cloud is taking longer to process the file than the time threshold. In addition to having the file sent to another cloud for processing, it may be beneficial to note that the current cloud is experiencing backpressure. To adjust for the backpressure leading to the delays in the processing of files, the weighting factor for selecting that particular cloud over other clouds may be decreased in step 1112. In step 1108, a new cloud is selected for the processing of the file (e.g., based on the processing time exceeding the time threshold and the file not having been processed). If a serialized version of the file is available, then the serialized version of the file may be sent to the selected cloud in step 1105. If the serialized version of the file is not available or if the file needs to be serialized again to fit requirements for the newly selected cloud, then then file may be serialized again in step 1104 and then sent to the selected cloud in step 1105.

Based on the above, a computer-implemented process may comprise receiving, at a gateway, a transaction data stream and parsing the transaction data stream into separate files. Each file may comprise multiple transactions. For a first file, the method may comprise selecting a first cloud-based processing system of multiple cloud-based processing systems. Each of the cloud-based processing systems may be configured to implement one or more functions on the received files. The first file may be serialized and sent to the selected cloud-based processing system. If the selected cloud-based processing system does not complete processing of the first file within a threshold, the method may select a second cloud-based processing system and send the first file to that selected second cloud-based processing system.

Further, in some aspects, the computer-implemented method may include: receiving system-agnostic instructions that describe a new function to be implemented on the separate files; modifying, into specific instructions for each cloud-based processing system, the system-agnostic instructions for the new function; and sending, to each cloud-based processing system, the specific instructions to implement the new function, where completing processing, for each cloud-based processing system, may include execution of the new function using specific instructions particular to each cloud-based processing system. The completed processing may include execution of the new function using specific instructions particular to the second cloud-based processing system. Modifying the system-agnostic instructions into specific instructions may be based on deployment instructions stored in a library of deployment instructions, and where the deployment instructions may convert the system-agnostic instructions into specific instructions unique to each cloud-based processing system. The transaction data stream may include financial transaction information. Each cloud-based processing system, of the multiple cloud-based processing systems, may be configured to perform functions may include decryption of the separate files, tokenization of information in the separate files into tokenized files, and serialization of the tokenized files for output to one or more data storages. Outputs of the multiple cloud-based processing systems may include real-time streams of the serialized tokenized files. Outputs of the multiple cloud-based processing systems may include information in at least one of: a JavaScript object notation (JSON) format or an Avro format. The determining may include: determining a sending time when the serialized first file was sent to the first cloud-based processing system; determining whether a time interval, from the sending time, has elapsed; and instructing, based on the determination that the time interval has elapsed, the gateway to send the serialized first file to the second cloud-based processing system. The selecting the second cloud-based processing system of the multiple cloud-based processing systems may include: receiving results of the determination that the first cloud-based processing system has not completed processing, within a time interval, of the serialized first file; receiving fail-over instructions for selecting a next cloud-based processing system; and selecting, based on the fail-over instructions, the second cloud-based processing system, where the fail-over instructions may include ordered fail-over instructions may include one or more levels of instructions, with each level instructing selection of a different cloud-based processing system. Each cloud-based processing system may include one or more regional subsystems, and where selecting the second cloud-based processing system of the multiple cloud-based processing systems may include selecting a different cloud-based processing system within a common region as the first cloud-based processing system and/or in a different region than the first cloud-based processing system. Implementations of the described techniques may include hardware, a method or process, or computer software on a computer-accessible medium.

The apparatus may comprise one or more processors with instructions that cause the processors to receive system-agnostic instructions for a function; generate, based on the system-agnostic instructions, system-specific instructions for each cloud-based processing system; send, for implementation by each cloud-based processing system on received files, the system-specific instructions; receive a transaction data stream; parse the transaction data stream into separate files, where each file may include multiple transactions; select, for a first file, a first cloud-based processing system of multiple cloud-based processing systems, where the multiple cloud-based processing systems are configured, as part of processing received files, to implement one or more functions on the received files; serialize the first file of the separate files; send, based on a selection of the first cloud-based processing system, the serialized first file to the first cloud-based processing system; determine whether the first cloud-based processing system has completed processing of the serialized first file; select, based on a determination that the first cloud-based processing system has not completed processing of the serialized first file, a second cloud-based processing system of the multiple cloud-based processing systems; and send, based on a selection of the second cloud-based processing system, the serialized first file to the second cloud-based processing system. Other embodiments of this aspect include corresponding computer systems, apparatus, and computer programs recorded on one or more computer storage devices, each configured to perform the actions of the methods.

An apparatus in accordance with one or more aspects may comprise instructions that further cause the apparatus to: receive, from the second cloud-based processing system, information identifying completed processing of the serialized first file, where the completed processing may include execution of the function using specific instructions particular to the second cloud-based processing system. The generation of specific instructions, from the agnostic instructions, may be based on deployment instructions stored in a library of deployment instructions, and where the deployment instructions convert the system-agnostic instructions into specific instructions unique to each cloud-based processing system. The transaction data stream may include financial transaction information. The system-specific instructions include instructions to perform functions may include decryption of the separate files, tokenization of information in the separate files into tokenized files, and serialization of the tokenized files for output to one or more data storages. The system-specific instructions include instructions to output real-time streams of the serialized tokenized files. The system-specific instructions include instructions to output information in at least one of: JavaScript object notation (JSON) format or Avro format. Implementations of the described techniques may include hardware, a method or process, or computer software on a computer-accessible medium.

A non-transitory media may store instructions that, when executed by a processor, cause the processor to perform functions comprising: receiving, at a gateway, a transaction data stream; parsing, at the gateway, the transaction data stream into separate files, where each file may include multiple transactions. The instructions also include selecting, for a first file, a first cloud-based processing system of multiple cloud-based processing systems, where the multiple cloud-based processing systems are configured, as part of processing received files, to implement one or more functions on the received file; serializing the first file of the separate files; sending, based on a selection of the first cloud-based processing system, the serialized first file to the first cloud-based processing system; and determining whether the first cloud-based processing system has completed processing of the serialized first file. The instructions may also include selecting, based on a determination that the first cloud-based processing system has not completed processing of the serialized first file, a second cloud-based processing system of the multiple cloud-based processing systems; sending, based on a selection of the second cloud-based processing system, the serialized first file to the second selected cloud-based processing system; selecting, for a second file, a third cloud-based processing system of multiple cloud-based processing systems; serializing the second file of the separate files; and sending, based on a selection of the third cloud-based processing system, the serialized second file to the third cloud-based processing system, where the serialized first file and the serialized second file are processed concurrently. Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, at a gateway, a transaction data stream;
   parsing, at the gateway, the transaction data stream into separate files, wherein each file comprises multiple transactions;
   selecting, for a first file, a first cloud-based processing system of multiple cloud-based processing systems, wherein the multiple cloud-based processing systems are configured, as part of processing received files, to implement one or more functions on the received files;
   serializing the first file of the separate files;
   sending, based on a selection of the first cloud-based processing system, the serialized first file to the first cloud-based processing system;
   determining whether the first cloud-based processing system has completed processing of the serialized first file;
   selecting, based on a determination that the first cloud-based processing system has not completed processing of the serialized first file, a second cloud-based processing system of the multiple cloud-based processing systems; and
   sending, based on a selection of the second cloud-based processing system, the serialized first file to the second cloud-based processing system.

2. The computer-implemented method of claim 1, further comprising:
   receiving system-agnostic instructions that describe a new function to be implemented on the separate files;
   modifying, into specific instructions for each cloud-based processing system, the system-agnostic instructions for the new function; and
   sending, to each cloud-based processing system, the specific instructions to implement the new function, wherein completing processing, for each cloud-based processing system, comprises execution of the new function using specific instructions particular to each cloud-based processing system.

3. The computer-implemented method of claim 2, further comprising:
receiving, from the second cloud-based processing system, an indication of completed processing of the serialized first file,
wherein the completed processing comprises execution of the new function using specific instructions particular to the second cloud-based processing system.

4. The computer-implemented method of claim 2,
wherein modifying the system-agnostic instructions into specific instructions is based on deployment instructions stored in a library of deployment instructions, and
wherein the deployment instructions convert the system-agnostic instructions into specific instructions unique to each cloud-based processing system.

5. The computer-implemented method of claim 1,
wherein the transaction data stream comprises financial transaction information.

6. The computer-implemented method of claim 1,
wherein each cloud-based processing system, of the multiple cloud-based processing systems, is configured to perform functions comprising decryption of the separate files, tokenization of information in the separate files into tokenized files, and serialization of the tokenized files for output to one or more data storages.

7. The computer-implemented method of claim 6,
wherein outputs of the multiple cloud-based processing systems comprise real-time streams of the serialized tokenized files.

8. The computer-implemented method of claim 6,
wherein outputs of the multiple cloud-based processing systems comprise information in at least one of: a JavaScript Object Notation (JSON) format or an Avro format.

9. The computer-implemented method of claim 1, wherein the determining comprises:
determining a sending time when the serialized first file was sent to the first cloud-based processing system;
determining whether a time interval, from the sending time, has elapsed; and
instructing, based on the determination that the time interval has elapsed, the gateway to send the serialized first file to the second cloud-based processing system.

10. The computer-implemented method of claim 1, wherein the selecting the second cloud-based processing system of the multiple cloud-based processing systems comprises:
receiving results of the determination that the first cloud-based processing system has not completed processing, within a time interval, of the serialized first file;
receiving fail-over instructions for selecting a next cloud-based processing system; and
selecting, based on the fail-over instructions, the second cloud-based processing system,
wherein the fail-over instructions comprise ordered fail-over instructions comprising one or more levels of instructions, with each level instructing selection of a different cloud-based processing system.

11. The computer-implemented method of claim 1,
wherein each cloud-based processing system comprises one or more regional subsystems, and
wherein selecting the second cloud-based processing system of the multiple cloud-based processing systems comprises selecting a different cloud-based processing system within a common region as the first cloud-based processing system.

12. The computer-implemented method of claim 1,
wherein each cloud-based processing system comprises one or more regional subsystems, and
wherein selecting the second cloud-based processing system of the multiple cloud-based processing systems comprises selecting a different cloud-based processing system within a different region than the first cloud-based processing system.

13. An apparatus comprising:
one or more processors; and
memory storing instructions that, when executed by the one or more processors, cause the apparatus to:
receive system-agnostic instructions for a function;
generate, based on the system-agnostic instructions, system-specific instructions for each cloud-based processing system;
send, for implementation by each cloud-based processing system on received files, the system-specific instructions;
receive a transaction data stream;
parse the transaction data stream into separate files, wherein each file comprises multiple transactions;
select, for a first file, a first cloud-based processing system of multiple cloud-based processing systems, wherein the multiple cloud-based processing systems are configured, as part of processing received files, to implement one or more functions on the received files;
serialize the first file of the separate files;
send, based on a selection of the first cloud-based processing system, the serialized first file to the first cloud-based processing system;
determine whether the first cloud-based processing system has completed processing of the serialized first file;
select, based on a determination that the first cloud-based processing system has not completed processing of the serialized first file, a second cloud-based processing system of the multiple cloud-based processing systems; and
send, based on a selection of the second cloud-based processing system, the serialized first file to the second cloud-based processing system.

14. The apparatus of claim 13, wherein the instructions further cause the apparatus to:
receive, from the second cloud-based processing system, information identifying completed processing of the serialized first file,
wherein the completed processing comprises execution of the function using specific instructions particular to the second cloud-based processing system.

15. The apparatus of claim 13,
wherein the generation of specific instructions, from the agnostic instructions, is based on deployment instructions stored in a library of deployment instructions, and
wherein the deployment instructions convert the system-agnostic instructions into specific instructions unique to each cloud-based processing system.

16. The apparatus of claim 13,
wherein the transaction data stream comprises financial transaction information.

17. The apparatus of claim 13,
wherein the system-specific instructions include instructions to perform functions comprising decryption of the separate files, tokenization of information in the separate files into tokenized files, and serialization of the tokenized files for output to one or more data storages.

18. The apparatus of claim 13,
wherein the system-specific instructions include instructions to output real-time streams of the serialized tokenized files.

19. The apparatus of claim 13,
wherein the system-specific instructions include instructions to output information in at least one of: JavaScript Object Notation (JSON) format or Avro format.

20. One or more non-transitory media storing instructions that, when executed by one or more processors, cause the one or more processors to perform steps comprising:
receiving, at a gateway, a transaction data stream;
parsing, at the gateway, the transaction data stream into separate files, wherein each file comprises multiple transactions;
selecting, for a first file, a first cloud-based processing system of multiple cloud-based processing systems, wherein the multiple cloud-based processing systems are configured, as part of processing received files, to implement one or more functions on the received files;
serializing the first file of the separate files;
sending, based on a selection of the first cloud-based processing system, the serialized first file to the first cloud-based processing system;
determining whether the first cloud-based processing system has completed processing of the serialized first file;
selecting, based on a determination that the first cloud-based processing system has not completed processing of the serialized first file, a second cloud-based processing system of the multiple cloud-based processing systems;
sending, based on a selection of the second cloud-based processing system, the serialized first file to the second selected cloud-based processing system;
selecting, for a second file, a third cloud-based processing system of multiple cloud-based processing systems;
serializing the second file of the separate files; and
sending, based on a selection of the third cloud-based processing system, the serialized second file to the third cloud-based processing system,
wherein the serialized first file and the serialized second file are processed concurrently.

\* \* \* \* \*